US006508365B1

(12) United States Patent
Cacace-Bailey et al.

(10) Patent No.: US 6,508,365 B1
(45) Date of Patent: Jan. 21, 2003

(54) METHOD OF REMOVING MAIL FROM A MAILSTREAM USING AN INCOMING MAIL SORTING APPARATUS

(75) Inventors: Melissa Cacace-Bailey, North Haven, CT (US); John H. Winkelman, Southbury, CT (US); Alberta A. Vitale, East Haven, CT (US); Christian A. Beck, Ridgefield, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/474,908

(22) Filed: Dec. 28, 1999

(51) Int. Cl.[7] .................... G06F 17/60

(52) U.S. Cl. .................... 209/584; 209/900; 700/30; 700/400

(58) Field of Search .................... 209/584, 900; 705/30, 400

(56) References Cited

U.S. PATENT DOCUMENTS

| | | | | |
|---|---|---|---|---|
| 4,998,626 A | * 3/1991 | Ota | 209/584 |
| 5,518,122 A | * 5/1996 | Tilles et al. | 209/539 |
| 5,619,648 A | * 4/1997 | Canale et al. | 395/200.01 |
| 5,703,783 A | * 12/1997 | Allen et al. | 700/213 |
| 5,742,932 A | * 4/1998 | Levitsky | 705/410 |
| 5,771,355 A | * 6/1998 | Kuzma | 395/200.62 |
| 5,819,241 A | * 10/1998 | Reiter | 705/408 |
| 5,999,932 A | * 12/1999 | Paul | 707/10 |
| 6,167,434 A | * 12/2000 | Pang | 709/206 |

* cited by examiner

*Primary Examiner*—Donald P. Walsh
*Assistant Examiner*—Joseph C Rodriguez
(74) *Attorney, Agent, or Firm*—Alberta A. Vitale; Angelo N. Chaclas; Charles R. Malandra, Jr.

(57) ABSTRACT

This invention overcomes the disadvantages of the prior art by providing a method of removing mail from the mail stream using a mail sorting apparatus. The foregoing is accomplished by providing a method that can determine whether mail is wanted or unwanted. Thus, the present invention is directed to, in a general aspect, a method of removing unwanted mail from a mail stream using an incoming mail sorting apparatus comprising the steps of: obtaining information from a mailpiece using the mail sorting apparatus; evaluating the information obtained from the mailpiece to determine whether the mailpiece should be delivered; delivering the mailpiece if it is determined that the mailpiece should be delivered to an intended recipient or out-sorting the mailpiece if it is determined that the mail-piece should not be delivered to the intended recipient. The method may also include the steps of collecting data regarding the mailpiece including data regarding mailpieces that should not be delivered and associating the data with the intended recipient. Additionally, the data collected could be used for calculating a cost of sorting the mailpiece. The method may also include the steps of determine whether future mailpieces from the mailer should be delivered; updating the database to include information obtained regarding delivery of the future mailpieces from the mailer.

6 Claims, 3 Drawing Sheets

METHOD OF REMOVING MAIL FROM A MAILSTREAM USING AN INCOMING MAIL SORTING APPARATUS

RELATED APPLICATIONS

Reference is made to application Ser. No. 09/474,909 titled METHOD OF CALCULATING SORTING COSTS FOR CHARGEBACK ACCOUNTING FOR AN INCOMING MAIL SORTING APPARATUS, assigned to the assignee of this application and filed on even date herewith.

FIELD OF THE INVENTION

The invention disclosed herein relates generally to automated mail sorting and more particularly, a method of removing unwanted mail from the mailstream using a mail sorting apparatus.

BACKGROUND

The processing and handling of mailpieces consumes an enormous amount of human and financial resources, particularly if the processing of the mailpieces is done manually. The processing and handling of mailpieces not only takes place at the Postal Service, but also occurs at each and every business or other site where communication via the mail delivery system is utilized. That is, various pieces of mail generated by a plurality of departments and individuals within a company need to be addressed, collected, sorted and franked as part of the outgoing mail process. Additionally, incoming mail needs to be collected and sorted efficiently to ensure that it gets to the addressee in a minimal amount of time. Since much of the documentation and information being conveyed through the mail system is critical in nature relative to the success of a business, it is imperative that the processing and handling of both the incoming and outgoing mailpieces be done efficiently and reliably so as not to negatively impact the functioning of the business. Additionally, it would be helpful if the expense of the time consuming task of sorting the mail could be accounted for and charged back to various departments of the company for which the mail is being sorted.

Some of the incoming mail received at a mailroom of the company can be unwanted or unsolicited mail, the quantity of which can be staggering (since each employee of the company can receive multiple mailpieces from bulk mailers, credit card companies, catalog companies etc. each day) and can exceed the quantity of solicited, anticipated, requested or wanted mail and/or mail with a business purpose. Some of the unwanted or unsolicited mail could be, for example, inappropriate mail or personal mail that an employee is receiving at the employee's company address such as, for example, retail catalogs. The unwanted or unsolicited mail is expensive to process since it drains the resources of the mail room requiring additional time and labor for sorting and delivery.

Mailroom expenses have typically been charged to various departments of the company that a mailroom serves by using allocation accounting methods. The total cost of running the mailroom is calculated and a percentage of that cost is allocated to each department that a mailroom serves. The percentage could be calculated for example, by using a square footage calculation such that a department that occupies 10% of the square footage of a building which the mailroom provides services to is allocated 10% of the mailroom cost. The allocation method however is inexact. Another method of attributing mailroom costs to the departments that the mailroom provides services to, is to charge back metering costs for outgoing mail. This is called post-centric charge back and is used for outgoing mail. Outgoing mail needs to be affixed with proper postage. Postage meters used to frank mailpieces can include accounting functionality that allows postage costs to be attributed to the department from which the mail originated. This method allows for more precise chargeback of the departments. However, this method is only available for outgoing mail. The distribution of mailroom costs for incoming mail still relies on allocation methods. Incoming mail has been franked at its origin and therefore, simply needs to be sorted and distributed upon arriving at the addressee's mailroom. The incoming mail processing costs can be great and a large quantity of the cost can be attributed to the processing of unwanted mail described above.

Various automated mail handling machines have been developed for processing incoming mail (removing individual pieces of mail from a stack and performing subsequent actions on each individual piece of mail). Generally, the mail handling machines separate individual mailpieces from a stack, read the mailpieces using an optical character recognition system (OCR) and compare the read information to an addressee database in order to determine the appropriate destination points for delivery of the mailpieces. However, these mail handling machines do not include functionality that would track the numbers and types of mailpieces that are sorted for each of the departments of the company for which the mail is being sorted, and calculate a charge back amount for accounting of mailroom expenses, including the expense of processing unwanted or unsolicited mail.

Thus one of the problems of the prior art is that a system is not available for removing unwanted mail from the mail stream. Another problem of the prior art is that a system is not available for calculating charge back costs sorting unwanted incoming mail, Another problem of the prior art is that expense allocation can be imprecise. Yet another problem of the prior art is that incoming mail handling machines do not provide detailed information about unwanted mail. Therefore, a method that removes unwanted mail from the mail stream and provides data about unwanted mail is needed.

SUMMARY OF THE INVENTION

This invention overcomes the disadvantages of the prior art by providing a method of removing unwanted mail from the mailstream. The foregoing is accomplished by providing a method that can determine whether mail is wanted or unwanted. Thus, the present invention is directed to, in a general aspect, a method of removing unwanted mail from a mail stream using an incoming mail sorting apparatus comprising the steps of: obtaining information from a mailpiece using the mail sorting apparatus; evaluating the information obtained from the mailpiece to determine whether the mailpiece should be delivered; delivering the mailpiece if it is determined that the mailpiece should be delivered to an intended recipient or out-sorting the mailpiece if it is determined that the mailpiece should not be delivered to the intended recipient. The method may also include the steps of collecting data regarding the mailpiece including data regarding mailpieces that should not be delivered and associating the data with the intended recipient. Additionally, the data collected could be used for calculating a cost of sorting the mailpiece.

In another embodiment, the method of removing unwanted mail from a mail stream using an incoming mail sorting apparatus comprises the steps of obtaining information from a mailpiece, including mailer information, using the mail sorting apparatus; evaluating the information obtained from the mailpiece and information obtained from an intended recipient to determine whether the mailpiece should be delivered; determining whether future mailpieces from the mailer should be delivered; updating the database to include information obtained regarding delivery of the future mailpieces from the mailer; delivering the mailpiece if it is determined that the mailpiece should be delivered to the intended recipient; out-sorting the mailpiece if it is determined that the mailpiece should not be delivered to the intended recipient.

Thus, an advantage of the method of the present invention is that it provides a method of removing unwanted mail from the mail stream. Another advantage is that a profile of mailers can be created for addressees. Another advantage is that mailroom expenses can be decreased by out-sorting unwanted mail. Yet another advantage of the method of the present invention is that costs associated with unwanted mail can be calculated. Other advantages of the invention will in part be obvious and will in part be apparent from the specification. The aforementioned advantages are illustrative of the advantages of the various embodiments of the present invention.

DETAILED DESCRIPTION OF THE PRESENT INVENTION

Figure 1:
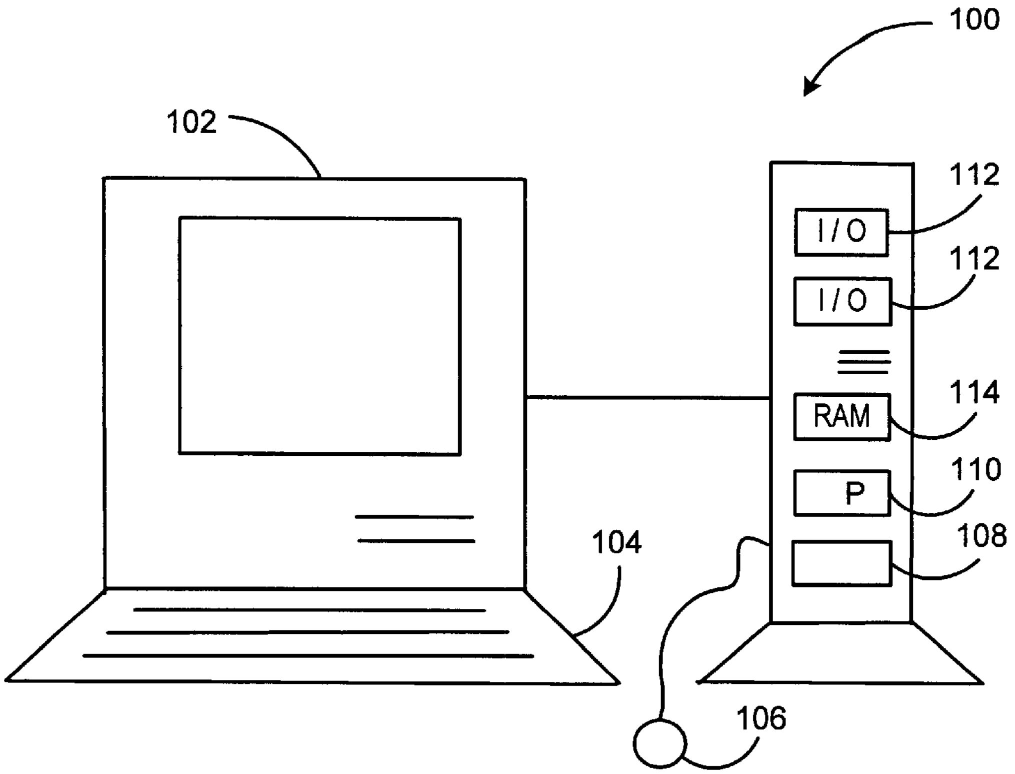
FIG. 1 is a block diagram that illustrates a computer system upon which an embodiment of the invention may be implemented.

In describing the present invention, reference will be made herein to FIGS. 1–4 of the drawings in which like numerals refer to like features of the invention. Features of the invention are not necessarily shown to scale in the drawings.

HARDWARE OVERVIEW

FIG. 1 is a block diagram that illustrates a computer system 100 upon which an embodiment of the invention may be implemented. Computer system 100 may be a personal computer which is used generically and refers to present and future microprocessing systems with at least one processor operatively coupled to user interface means, such as a display 102 and keyboard 104, and/or a cursor control, such as a mouse or a trackball 106, and storage media 108. The personal computer 100 may be a workstation that is accessible by more than one user. The personal computer also includes a conventional processor 110, such as the Pentium II™ microprocessors manufactured by Intel, and conventional memory devices such as hard drive 108, floppy drive(s) 112, and memory 114.

Figure 2:
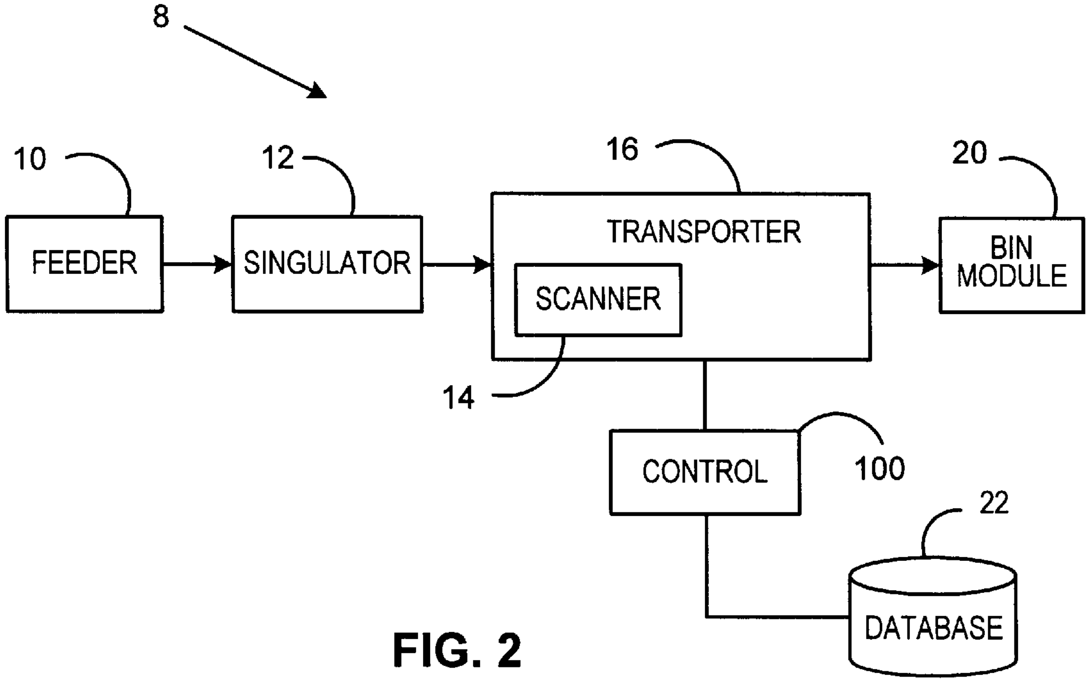
FIG. 2 illustrates the connection of the computer system to the sorting apparatus.

The computer system 100 is connected to a sorting apparatus 8 as illustrated in FIG. 2. The mailpiece sorting apparatus 8 may generally comprise a feeder 10, a line scan camera 14 (and OCR software, now shown), a mailpiece transporter 16, compartments or bins 20 for receiving sorted mailpieces and a control system which may be the microprocessor based personal computer system 100 described above. The system may be controlled by a microprocessor controller 100 such as, for example the personal computer 100 with a Pentium II™ microprocessor. The microprocessor can run an operating system such as a QNX operating system which provides real-time control of the components of the mailpiece sorting apparatus 8. The computer includes appropriate memory devices 108, 114 for storage of information such as an address database 22. One of ordinary skill in the art would be familiar with the general components of the sorting apparatus upon which the method of the present invention may be performed.

Figure 3:
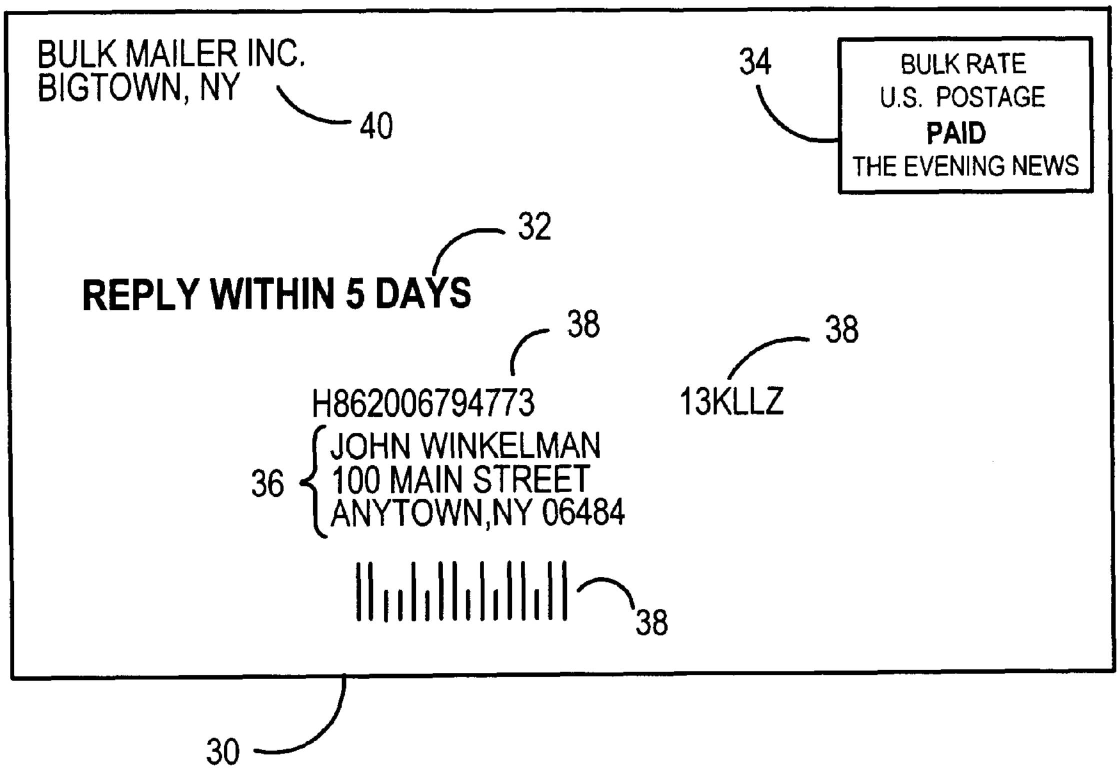
FIG. 3 is a mailpiece illustrating some of the various information which may be found on the face of the mailpiece.

The mail sorting apparatus 8 and the OCR software may be used to determine whether the mailpiece is wanted or unwanted by determining whether the face of mail piece contains information which would be indicative of the mailpieces status such as, for example, 1) banner information e.g. "reply within 5 days" or "bill enclosed", 2) return address of an unwanted mailer; 3) an indicia or a permit mark such as "bulk rate third class"; 4) ancillary information e.g. alpha-numeric codes or barcodes appearing near the addressee's information; or 5) two-dimensional barcode such as postal description format (printed adjacent to an indicia) which can include mailer, addressee, class information etc. about the mailpiece. FIG. 3 illustrates some of the various types of information that can be found on a mailpiece 30 including banner information 32, indicia or permit mark 34, addressee information 36 and ancillary information 38. A return address 40 may also be included on mailpiece 30. It should be noted that any combination of information may be found on the face of the mailpiece 30; however, the combination will always include the addressee information 36 and an indicia or permit mark 34. The reading of various information may be performed with the assistance of intelligent character recognition (ICR) or imaging and character recognition (OCR/IC) which may be part of the above mentioned OCR software and can read the various fields on the mailpiece 30.

The present invention is related to the use of computer system 100 connected to the mailpiece sorting apparatus 8 for performing application software methods. The method of the present invention is used to remove unwanted mail from the maiustream and provide data on unwanted mail.

REMOVING UNWANTED MAIL

Figure 4:
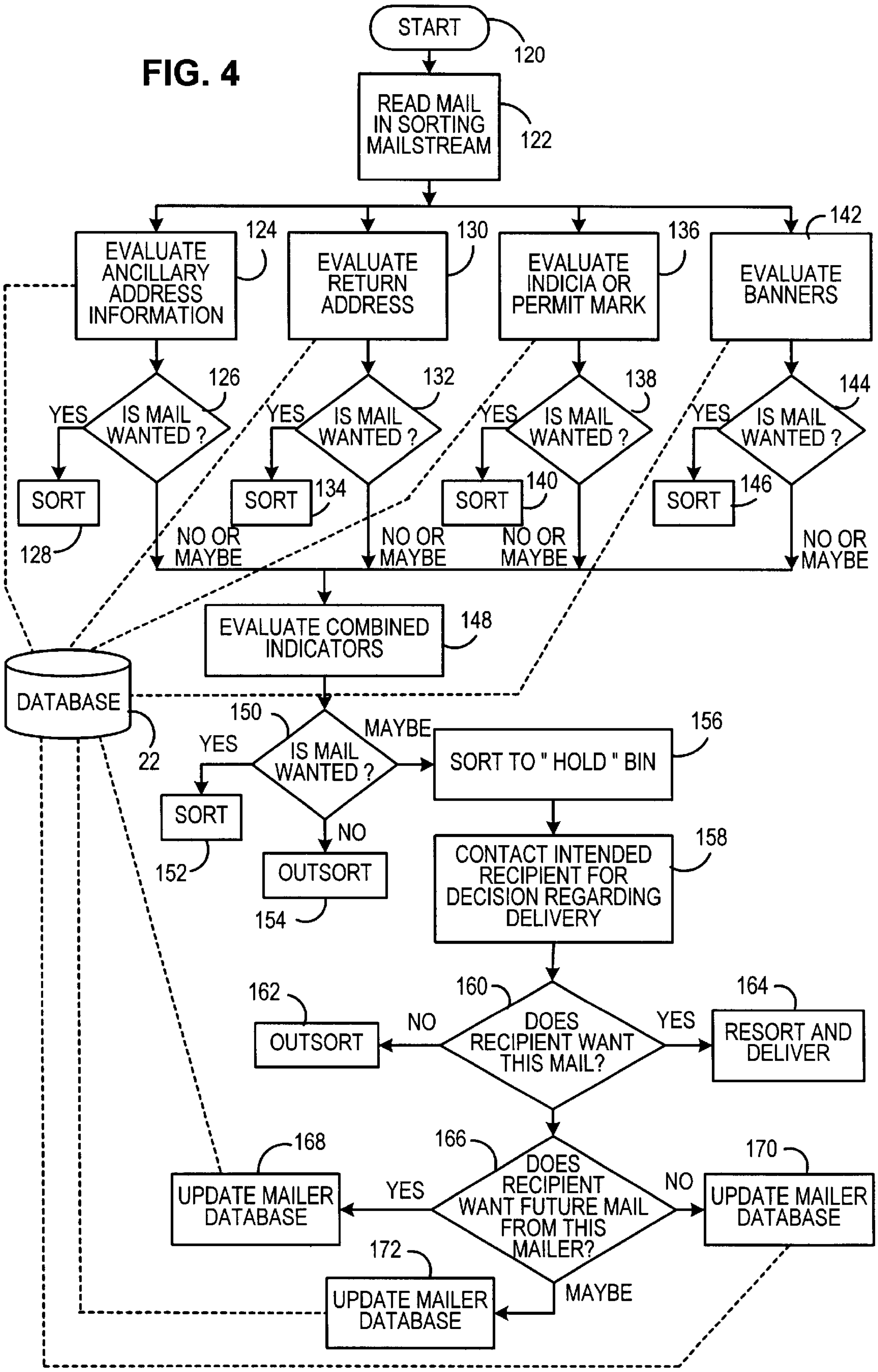
FIG. 4 is a flowchart of an embodiment of the method of removing unwanted mail from the mailstream.

FIG. 4 is a flowchart of an embodiment of the method of removing unwanted mail from the mailstream. At step 120, the method begins. At step 122, the mailpiece 30 in the mail stream of the sorting apparatus 8 is read. At step 124, any ancillary information read from the mailpiece and information in the database 22 is evaluated. At step 126, a query is made as to whether the mailpiece is wanted based upon the ancillary information on the mailpiece and information in the database 22. If the mailpiece is wanted, at step 128 the mailpiece is sorted. At step 130, any return address 40 read from the mailpiece and information in the database 22 is evaluated. At step 132, a query is made as to whether the mailpiece is wanted based upon the return address 40 information and information in the database 22. If the mailpiece is wanted, at step 134, the mailpiece is sorted. At step 136, any indicia or permit information 34 read from the mailpiece and information in the database 22 is evaluated. At step 138, a query is made as to whether the mailpiece is wanted based upon the return address information and information in the database 22. If the mailpiece is wanted, at step 140, the mailpiece is sorted. At step 142, the banner 32 read from the mailpiece and information in the database 22 is evaluated. At step 144, a query is made as to whether the mailpiece is wanted based upon the banner information and information in the database 22. If the mailpiece is wanted, at step 146, the mailpiece is sorted. The performance of steps 126, 132, 138 and 144 is tied to a search of a mailer database 22 that is stored in association with each addressee for which mail is being sorted. The database 22 can include addressee information and mailer and delivery information pertaining to each addressee.

If the result of queries 126, 132, 138 or 144, is no or maybe, then the information evaluated in each of those steps to which the answer is "no" or "maybe" is evaluated in combination at step 148. The combined evaluation may be performed by one of ordinary skill in the art using a rule based inference engine and evaluating the combination of information using a set of weights associated with each rule. Next at step 150, a query is made as to whether the mailpiece 30 is wanted. If the mailpiece 30 is wanted, at step 152, it is sorted and subsequently delivered to the intended recipient. If the mailpiece 30 is unwanted, then at step 154, it is out-sorted. If at step 150, the answer to the query is "maybe", then at step 156, the mailpiece 30 is sorted to a hold bin in bin module 20 (where it is held until a determination regarding delivery is made by the intended recipient). Next, at step 158, an electronic mail message including an image of the mailpiece is sent to the intended recipient for evaluation, Next at step 160, a query is made as to whether the recipient would like to have the mailpiece delivered. If at step 160, the recipient does not want the mailpiece delivered, then at step 162, the mailpiece is out-sorted. If at step 160, the recipient does want the mailpiece delivered, then at step 164, the mailpiece is resorted and delivered. Regardless of the answer to the query of step 160, at step 166, the recipient is asked to determine whether future mail from this mailer should be delivered. If at step 166, the recipient determines that future mailpieces from the mailer should be delivered, then at step 168, the mailer database 22 associated with the recipient is updated to reflect that decision. If at step 166, the recipient determines that future mailpieces from the mailer should not be delivered, then at step 170, the mailer database 22 is updated to reflect that decision. If at step 166, the recipient determines that he or she is uncertain whether future mailpieces from the mailer should be delivered, then at step 172, the mailer database 22 is updated to reflect that decision. In the case where the recipient indicates uncertainty about future delivery, the recipient will be notified by electronic mail, as in step 158, to make a determination for each future mailpiece from that mailer. As the database is updated, the mail sorting apparatus 8 creates a set of instructions about the future delivery of mailpieces. The database 22 is an evolving profile of mailers associated with each addressee. In an alternate embodiment, the method of the present invention may also include a feature that generates correspondence to unwanted mailer(s) requesting that the addressee be removed from the mailer(s)' mailing list.

In addition to storing information about the mailers and intended recipients, the mail sorting apparatus 8 may also store information about the piece count or number of unwanted mailpiece sorted for each intended recipient. This information can then be used to help better allocate resources or determine whether an employee is receiving inappropriate mailpieces at the workplace. Additionally, the piece count can be used to calculate a charge back amount for mail sorting charges. For example, a department can be charged by the mailroom for the out-sorting of unwanted mailpieces, A cost per unwanted mailpiece could be input into the computer system 100. For example. if it were determined that each unwanted mailpiece cost $0.02 to out-sort, that amount could be input into the mail sorting apparatus and a calculation could be performed using the piece count information to calculate a charge back amount e.g. 150 piece times $0.02 per piece for a particular department totals $3.00 in charge backs. The cost per mailpiece could alternately be stored in the computer system 100 for future use or could be stored prior to the execution of the method. Additionally, the cost per mailpiece could be edited as needed.

It should be noted that information an be collected and stored in association with a delivery point code and that each person in that department could have the same delivery point code or, alternately, each person in a department can have a unique delivery point code. The delivery point code uniqueness is tied to the level of precision that a report can be generated. It should also be noted that the example sorting using delivery point codes is an embodiment of the present invention and is not meant to limit the method of the present invention. Other suitable sorting methods may be used as determined by one of ordinary skill in the art.

It should also be noted that removal of mailpieces from the mail stream after the mailpieces have been delivered to the company should be done under the guidelines of a company policy. The policy should state that company considers mailpieces that have been delivered to the company mailroom, property of the company. The policy should be distributed to employees (intended recipients of mail) of the company. Mailroom service providers may use the method of the present invention but should do so after obtaining the consent of their customer(s).

The method of the present invention provides for removal of unsolicited or unwanted mail from the mailstream and provides data about the unwanted mail. Additionally, the method can be used to charge back the cost of sorting unwanted mail. Thus, the method of the present invention provides a method that can save sorting and delivery costs. Additional advantages and modifications will readily occur to those skilled in the art. Therefore, the invention in its broader aspects is not limited to the specific details and representative devices, shown and described herein. Accordingly, various modifications may be made without departing from the spirit or scope of the general inventive concept as defined by the appended claims.

What is claimed is:

1. A method of removing unwanted physical mail from a mail stream using an incoming mail sorting apparatus, the incoming mail sorting apparatus comprising a feeder, an OCR system positioned downstream from the feeder and at least two bins positioned downstream from the OCR system, the method comprising the steps of:

a) obtaining information from a physical mailpiece, the physical mailpiece having been received from a mail delivery provider, using the mail sorting apparatus;

b) evaluating the information obtained from the physical mailpiece to determine whether the mailpiece should be delivered, the information obtained from the physical mailpiece being indicative of mailpiece status;

c) delivering the physical mailpiece if in step b) it is determined that the physical mailpiece should be delivered to an intended recipient: and d) out-sorting the physical mailpiece if in step b) it is determined that the physical mailpiece should not be delivered to the intended recipient.

2. The method as claimed in claim 1 further comprising the steps of:

e) collecting data regarding the physical mailpiece including data regarding whether that physical mailpiece should be delivered and associating the data with the intended recipient.

3. A method of removing unwanted physical mail from a mail stream using an incoming mail sorting apparatus, the incoming mail sorting apparatus comprising a feeder, an OCR system positioned downstream from the feeder and at least two bins positioned downstream from the OCR system, the method comprising the steps of:

a) obtaining information from a physical mailpiece using the mail sorting apparatus;

b) evaluating the information obtained from the physical mailpiece to determine whether the mailpiece should be delivered;

c) delivering the physical mailpiece if in step b) it is determined that the physical mailpiece should be delivered to an intended recipient;

d) out-sorting the physical mailpiece if in step b) it is determined that the physical mailpiece should not be delivered to the intended recipient;

e) collecting data regarding the physical mailpiece including data regarding whether that physical mailpiece should be delivered and associating the data with the intended recipient; and f) calculating a cost of sorting the physical mailpiece using the data collected in step e), the cost including a cost of out-sorting the physical mailpiece as performed in step d).

4. A method of removing unwanted physical mail from a mail stream using an incoming mail sorting apparatus the incoming mail sorting apparatus comprising a feeder, an OCR system positioned downstream from the feeder, at least two bins positioned downstream from the OCR system, an operatively coupled processor and a memory device, the method comprising the steps of;

a) obtaining information from a physical mailpiece, including information about a mailer, using the mail sorting apparatus;

b) evaluating the information obtained from the physical mailpiece and information obtained from an intended recipient to determine whether the mailpiece should be delivered;

c) determining whether future physical mailpieces from the mailer should be delivered;

d) updating a database stored in the memory device to include information obtained in step c) regarding delivery of the future physical mailpieces from the mailer;

e) delivering the physical mailpiece if in step b) it is determined that the physical mailpiece should be delivered to the intended recipient; and f) out-sorting the physical mailpiece if in step b) it is determined that the physical mailpiece should not be delivered to the intended recipient.

5. The method as claimed 4 further comprising the step of:

g) preparing correspondence to the mailer regarding removal of the intended recipient from a mailing list of the mailer.

6. A method of removing unwanted physical mail from a mail stream using an incoming mail sorting apparatus, the incoming mail sorting apparatus comprising a feeder, an OCR system positioned downstream from the feeder and at least two bins positioned downstream from the OCR system, the method comprising the steps of:

a) obtaining information from a physical mailpiece using the mail sorting apparatus;

b) evaluating the information obtained from the physical mailpiece to determine whether the mailpiece should be delivered;

c) delivering the physical mailpiece if in step b) it is determined that the physical mailpiece should be delivered to an intended recipient; and d) out-sorting the physical mailpiece if in step b) it is determined that the physical mailpiece should not be delivered to the intended recipient; and wherein a cost of out-sorting the physical mailpiece is determined by using a cost per physical mailpiece that is calculated using a piece count stored in the incoming mail sorting apparatus and an allocation accounting method.

* * * * *